United States Patent [19]

Burns et al.

[11] 4,299,157
[45] Nov. 10, 1981

[54] CONTROLLED TENSION DEVICE

[75] Inventors: Dallas D. Burns, Brooklyn Park, Minn.; Jack D. Brannan, Springfield, Mo.

[73] Assignee: The United States of America as represented by the Secretary of the Navy, Washington, D.C.

[21] Appl. No.: 106,790

[22] Filed: Dec. 26, 1979

[51] Int. Cl.³ .............................................. F41F 5/02
[52] U.S. Cl. .................................................. 89/1.5 D
[58] Field of Search .......................... 89/1.5 D; 102/2; 89/1.5 R

[56] References Cited

U.S. PATENT DOCUMENTS

| | | | |
|---|---|---|---|
| 2,918,845 | 12/1959 | Fleming | 89/1.5 E |
| 3,703,844 | 11/1972 | Bleikamp | 89/1.5 D |
| 3,712,169 | 1/1973 | Koff et al. | 89/1.5 D |
| 3,939,754 | 2/1976 | Dexter | 89/1.5 D |
| 3,983,784 | 10/1976 | Maughlin | 89/1.5 D |
| 3,998,124 | 12/1976 | Milhous et al. | 89/1.5 D |
| 4,088,055 | 5/1978 | West et al. | 89/1.5 D |

FOREIGN PATENT DOCUMENTS 2406585  2/1974  Fed. Rep. of Germany .... 89/1.5 D

Primary Examiner—David H. Brown
Attorney, Agent, or Firm—R. S. Sciascia; W. Thom Skeer

[57] ABSTRACT

An arming wire extractor controlled tension device for an aircraft delivered weapon comprising a controlled tension device which comprises a coil of wound wire with a straight end that is pulled through an orifice that allows the application of a force for extracting the arming wire such that it yields a relatively constant force and the angle of pull through the orifice is not a significant variable in firing.

7 Claims, 2 Drawing Figures

CONTROLLED TENSION DEVICE

BACKGROUND OF THE INVENTION

This invention relates to the arming of aircraft delivered weapons and especially to an arming wire extractor comprising a controlled tension device. Heretofore, upon positive arming after release of suspension lugs of an aircraft store, excessive dynamic loads are placed on the arming solenoids of aircraft bomb racks. This invention allows the drag force to remain essentially static thus providing a simple and reliable solution to the excessive dynamic loads placed upon the arming solenoids.

A design problem frequently encountered during the development of aircraft delivered weapons is the need for pilot communication to the weapon prior to release from the aircraft bomb ejection rack. If the pilot intends to deliver live ordnance, he will typically arm the weapon by energizing an electrical solenoid which is a component of the bomb rack. In this way, the pilot can remotely achieve the release of either live or unarmed (e.g., for safe jettison in the vicinity of friendly forces) ordnance from the cockpit of the delivery aircraft. The solenoid of the bomb rack typically engages a wire running longitudinally along the back of the weapon and upon separation of the weapon from the aircraft, the arming wire is extracted. This action causes arming of the weapon fuzing system. On rare occasions, one of the two suspension lugs of the weapon fails to properly disengage from the bomb rack. If the arming wire of such a "hung store" is extracted by the motion of the weapon, an extremely hazardous condition can result. If the total tensile force applied through the arming wire extraction system to the bomb rack solenoid exceeds 100 lb., the solenoid can sustain damage rendering it inoperable. If the arming wire extraction system is designed to delay arming until the weapon/bomb rack separation is sufficient to ensure that both suspension lugs have released properly, the effects of variable weapon attitude (pitch, roll and yaw) and variable trajectory must be considered. The arming wire extraction system shall not arm the weapon as a result of impulsive loading which could result from a bird impact with any of its external parts.

The solution to this design problem as embodied in the subject invention is a compact device which allows arming wire extraction to occur as a result of a sustained extraction force, over a finite distance, regardless of minor variations in pull angle or dynamic weapon separation rate.

SUMMARY OF THE INVENTION

The present invention comprises an arming wire extractor controlled tension device for an aircraft delivered weapon. This invention illustrates the critical geometric parameters of a discrete mechanization of a constant force pull wire which allows the drag force to remain essentially static during positive arming of the weapon after the release of suspension lugs of the aircraft store.

The arming wire extractor controlled tension device for an aircraft delivered weapon of this invention encompasses a sealed assembly without moving parts, very compact, and yields simple and repeatable performance. Moreover, it is useful upon a multitude of weapon systems wherein an arming wire extractor is used for aircraft delivered weapons.

An object of the invention is to provide an arming wire extractor device by which the tension of the arming wire is controlled.

Another object of the invention is to provide an arming wire extractor controlled tension device that is compact, readily yields simple and repeatable performance, has no moving parts and is useful upon a multitude of weapon systems wherein an arming wire extractor is used for aircraft deliverd weapons.

Other objects, uses, advantages and unique feature of the present invention will become apparent from the following detailed description of the invention when considered in conjunction with the accompanying drawings.

DETAILED DESCRIPTION OF THE INVENTION

Figure 1:
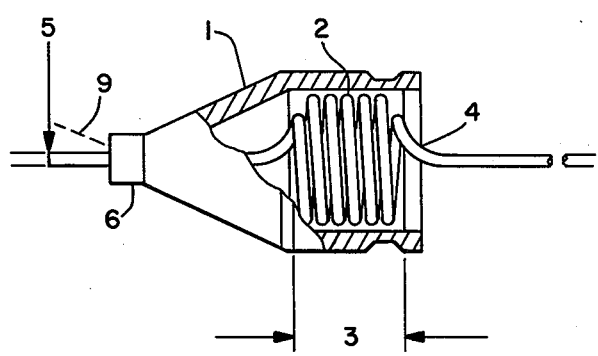
FIG. 1 is a longitudinal sectional view of the embodiment of the invention.
Figure 2:
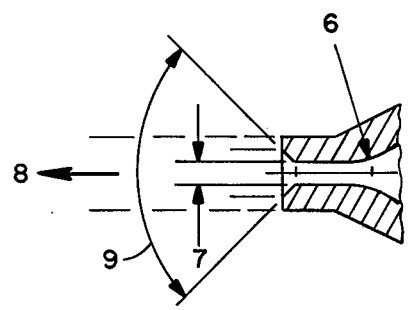
FIG. 2 is a longitudinal section view of the orifice of the invention.

FIG. 1 shows an arming wire extractor controlled tension device for an aircraft delivered weapon system (not shown) of this invention. FIG. 2 illustrates in a section view the critical geometric parameters of the orifice of the arming wire extractor controlled tension device for an aircraft delivered weapon system (not shown) of this invention. The drag force (8) provided by this invention, up to and including an angle of pull at 45° (9), is relatively constant at from about 58 to about 82 pounds. This force is measured with a spring scale (not shown) as the extractor end (5) of wire coil (2) is pulled out of orifice (6) in housing (1), which is attached to the weapon system through a protective tubing (not shown). The relatively constant drag force (8) on wire coil extractor end (5) allows positive arming of the weapon (not shown) without imposing excessive dynamic loads on the arming solenoids of aircraft bomb racks by output end (4) of coil (2).

Typical dimensions and materials are as follows:

arming-wire diameter—055+0.000-0.002 inch stainless steel, corrosion resisitng, and annealed.

wire coil diameter within housing—0.700 inch, maximum with six coils, dimension (3).

orifice—0.008+0.005-0.000 inch, having a maximum angle of pull at extractor end of 45°.

This invention may be used on other aircraft released stores based upon its simple and reliable solution to a chronic design problem, namely, positive arming after release of suspension lugs of an aircraft store, without imposing excessive dynamic loads on the arming solenoids of aircraft bomb racks.

Obviously, many modifications of the present invention are possible in light of the above teachings. It is therefore to be understood that, within the scope of the appended claims, the invention may be practiced otherwise than as specifically described.

What is claimed is:

1. An arming wire device comprising:
   a housing having a forward and an aft end;
   an orifice in said forward end of said housing;
   a coil of wire within said housing said coil of wire having an extractor end extending through said orifice to permit a pulling force to be applied thereto to extract said wire from said housing and having an output end.

2. A device as in claim 1, wherein said coil of wound wire is further defined as a coiled spring with straight extractor and output ends.

3. A device as in claim 1, wherein said orifice design allows an extractant pull force at an angle with no apparent effect on the pull force as compared to a straight in-line pull.

4. A device as in claim 3, wherein said angle of pull is up to 45°.

5. A device as in claim 1, wherein said orifice exerts a drag force that is relatively constant.

6. A device as in claim 5, wherein said drag force ranges from about 58 to about 82 pounds.

7. A device as in claim 6 wherein said orifice is constructed to offer a stable load to a pulling force aplied to said extractor end of said wire.

* * * * *